United States Patent [19]

Taylor

[11] 4,322,670

[45] Mar. 30, 1982

[54] LAND VEHICLE GUIDANCE METHOD AND APPARATUS

[75] Inventor: Charles L. Taylor, Binghamton, N.Y.

[73] Assignee: The Raymond Corporation, Greene, N.Y.

[21] Appl. No.: 26,041

[22] Filed: Apr. 2, 1979

Related U.S. Application Data

[63] Continuation-in-part of Ser. No. 840,504, Oct. 7, 1977, abandoned.

[51] Int. Cl.³ ............................................. B62D 1/24
[52] U.S. Cl. ..................................... 318/587; 180/168
[58] Field of Search ................ 180/167, 168; 318/576, 318/587, 577

[56] References Cited

U.S. PATENT DOCUMENTS

| | | | |
|---|---|---|---|
| Re. 30,492 | 1/1981 | Blakeslee | 180/168 |
| 2,339,291 | 1/1944 | Paulus et al. | 340/53 |
| 2,742,099 | 4/1956 | Hagen | 180/168 |
| 2,847,080 | 8/1958 | Zworykin et al. | 180/168 |
| 3,009,525 | 11/1961 | Liban | 180/168 |
| 3,033,305 | 5/1962 | Harned et al. | 180/168 |
| 3,498,403 | 3/1970 | Kohls | 180/168 |
| 3,668,499 | 6/1972 | Malloy | 318/587 |
| 3,757,887 | 9/1973 | Moore et al. | 318/587 X |
| 3,993,156 | 11/1976 | Rubel | 318/587 X |
| 4,043,418 | 8/1977 | Blakeslee | 318/587 X |
| 4,044,853 | 8/1977 | Melke | 318/587 X |
| 4,088,939 | 5/1978 | Mitschke et al. | 318/576 |
| 4,168,760 | 9/1979 | Paul, Jr. et al. | 318/587 X |
| 4,253,541 | 3/1981 | Iida et al. | 180/168 |

*Primary Examiner*—Joseph F. Peters, Jr.
*Assistant Examiner*—Michael Mar
*Attorney, Agent, or Firm*—Richard G. Stephens

[57] ABSTRACT

To enable a vehicle which can automatically track a substantially straight guidewire or the like at high speeds with prescribed dynamic characteristics to also track distinct guidewire curves with similar characteristics, an added signal which is a function of guidewire curvature and vehicle wheelbase is superimposed on the command signal derived from a tracking sensor to modify the command signal applied to a steering servo or other steering means while the vehicle negotiates a curve.

30 Claims, 19 Drawing Figures

LAND VEHICLE GUIDANCE METHOD AND APPARATUS

This invention relates to method and apparatus for automatically steering land vehicles and this application is in some respects a continuation-in-part of my prior copending application Ser. No. 840,504 filed Oct. 7, 1977, now abandoned.

Some related prior art which may be of interest is shown in the following U.S. Pat. Nos.:

2,339,291—Paulus et al
2,742,099—Hagen
2,847,080—Zworykin et al
3,009,525—DeLiban
3,033,305—Harned et al
3,498,403—Kohls
3,993,156—Rubel
4,043,418—Blakeslee My prior application discloses several systems which enable a vehicle to automatically and closely track an energized floor-buried guidewire, in both forward and reverse directions, at higher speeds and with closer tracking than what I believe to have been theretofore attainable. Those systems disclosed are mainly useful, however to provide high-speed close-tracking only along guidewires which are straight or substantially straight. Most warehousing and material handling installations utilize straight aisles between storage racks, the speeds of material handling vehicles usually must be materially decreased when distinct turns are made, so as to avoid overturning or spilling a load, and close tracking is especially important when a vehicle is situated in an aisle so as to avoid collision with a storage rack, and thus the systems shown in the mentioned application have great utility. While vehicles frequently must turn at the ends of aisles, to leave one aisle and enter a parallel adjacent aisle, for example, or to enter a perpendicularly extending aisle, as another example, in many applications that turning can be done manually by an on-board vehicle operator. However, in fully automatic systems it is necessary that automatic steering be effected during distinct turns as well as during straight-line travel. It is also desirable in some applications involving rider-operated lift trucks that automatic steering around distinct turns be provided. One object of the invention is to provide improved vehicle guidance method and apparatus which can provide automatic steering around distinct turns as well as during essentially straight-line travel. It is generally desirable in material handling applications that rather small-radius turns be made at the ends of aisles in order that guidewire-defined turning spaces consume minimum floor area, and another object of the invention is to provide improved wire-guidance method and apparatus which will allow short radius turns to be made. Material handling vehicles commonly include a pair of non-steerable wheels at one end and one or a pair of steerable wheels at an opposite end. Another object of the invention is to provide improved wire-guidance method and apparatus which will provide automatic steering around turns in either the travel direction in which the non-steered wheels are leading or the opposite travel direction in which the steerable wheel (or wheels) is leading. A further object is to provide improved guidance method and apparatus which allows travel in either direction along a curved guidewire.

A practical system for high-speed travel along a straight guidewire ordinarily includes means which will decelerate and then stop a vehicle if deviations from the guidewire exceed desired limit values. For example, in one prior system, the vehicle speed is decreased if heading deviation from the guidewire exceeds 1.5° or if displacement exceeds 1.5 inches (3.81 cm.) and the vehicle is stopped if heading exceeds 3° or if displacement exceeds 3 inches (7.62 cm.). If a vehicle is traveling at high speed, a small heading deviation from the guidewire can rapidly result in a substantial displacement of the vehicle from the wire, and thus systems capable of tracking at high speeds require large sensitivity to, or large amplification of, heading error signals, so that small heading errors rapidly reorient a steerable wheel or the like to correct such heading errors before substantial displacement error can build up. The use of large sensitivity to heading error tends to also require substantial sensitivity to displacement error if a desired damping characteristic, such as critical damping, is to be achieved. Calling displacement sensitivity $K_1$ and heading sensitivity $K_2$ as in my prior application, the system damping factor $\zeta$ is expressed as:

$$\zeta = \frac{K_2 - K_1 c}{2\sqrt{K_1 B}}$$

where B is the wheelbase of the vehicle and c is the rearward distance of the vehicle sensor from the vehicle non-steerable wheel axis. For a vehicle steered by means of a steerable wheel, $K_1$ is the amount which the steerable wheel is turned per unit of lateral displacement, given in radians per inch or radians per centimeter, for example, and $K_2$ is the amount which the steerable wheel is turned per unit of heading deviation, given in radians per radian, for example.

If one uses $K_1$ and $K_2$ values which provide satisfactory operation for high-speed travel along a straight wire, use of the system along a distinctly curved section of guidewire gives rise to distinct problems, even at low vehicle speeds. Curvature in the guidewire creates very large error signals which greatly exceed the limit values deemed acceptable for straight-line travel, tending to shut down the vehicle. When traveling down a straight wire, a steady-state condition occurs when the vehicle is centered over the wire and heading and displacement errors are both zero. However, for travel along a curved section of guidewire, such a system cannot be in a steady-state condition unless it has a lateral displacement far exceeding that which is deemed allowable. An important object of the invention is to provide improved steering method and apparatus useful for both straight-line steering and turning in which steering control may be effected within the same limits during turns as during straight-line travel.

Another object of the invention is to avoid having to radically alter the steering servo or vehicle dynamics between straight-line travel and turning. It is possible to decrease the intolerably large steady-state displacement errors which occur during curved wire travel by markedly increasing the displacement sensitivity ($K_1$) during such travel. Increasing $K_1$ has a somwhat adverse effect on system natural frequency, although that effect usually is not serious because turns are made at much slower speeds than those used during straight-line travel. However, markedly increasing $K_1$ tends to markedly decrease the damping factor, unless one also markedly increases the heading error sensitivity, $K_2$. It is frequently not practical to increase $K_2$ sufficiently to maintain desired damping, for the reason that the system then becomes too susceptible to minor anomalies or aberrations in the electromagnetic guidewire field prevalent in industrial applications.

It is desirable that the dynamic stability of an automatic steering system be controlled at all times. My prior application illustrates sytems in which a desired steering system damping, such as critical damping, for example, can be achieved over a very wide range of vehicle speeds. It is often desirable that damping be similarly controlled for all orientations and directions of travel during turns, and provision of method and apparatus which allow effective control of damping during turns as well as during straight-line travel is another object of the invention. Some further objects of the invention are to provide guiewire systems and improved steering control method and apparatus which allows vehicles to enter into turns and exit from turns with minimum swerving and minimum sudden lateral accelerations of the vehicle, which lessens tendencies for loads to shift or slide aboard the vehicle, as well as decreasing wear.

In accordance with a central concept of the present invention, the aforementioned objects are accomplished very simply and economically by adding to the basic systems disclosed in my prior application, turning control means operative when a curved section of guidewire is encountered to apply as an added component in the steering command signal, a signal which is substantially directly proportional, though not necessarily linearly proportional to the wheelbase of the vehicle and inversely proportional to the radius of curvatuve of the guidewire. Then as the vehicle traverses the curved section of guidewire, the error signals continue to resemble those encountered during straight-line travel, and the limit circuitry operates the same as it does during straight-line travel.

It should be noted that the broad idea of applying predetermined command signals to a steering servo as a turn is encountered is not wholly new; in U.S. Pat. No. 3,507,349, for example, predetermined command signals are applied to a steering servo to cause a "programmed turn". However, in that system the predetermined signals themselves completely control the steering of the vehicle, to the exclusion of the guidewire, in an "open loop" fashion, so that nothing guarantees or tests the vehicle position relative to the guidewire during a turn. In the system of the present invention, however, the position of the vehicle relative to the guidewire is constantly monitored and controlled, which is highly desirable.

Other objects of the invention will in part be obvious and will in part appear hereinafter.

The invention accordingly comprises the several steps and the relation of one or more of such steps with respect to each of the others, and the apparatus embodying features of construction, combination of elements and arrangement of parts which are adapted to effect such steps, all as exemplified in the following detailed disclosure, and the scope of the invention will be indicated in the claims.

For a fuller understanding of the nature and objects of the invention reference should be had to the following detailed description taken in connection with the accompanying drawings, in which:

FIG. 6b illustrates a modification which may be made to the system of FIG. 1 to accommodate its use with a guidewire having a curvature variation of the type illustrated in FIG. 6a.

FIG. 7b is a schematic diagram of a control circuit according to the invention for use with the vehicle depicted in FIG. 7a.

Figure 9:
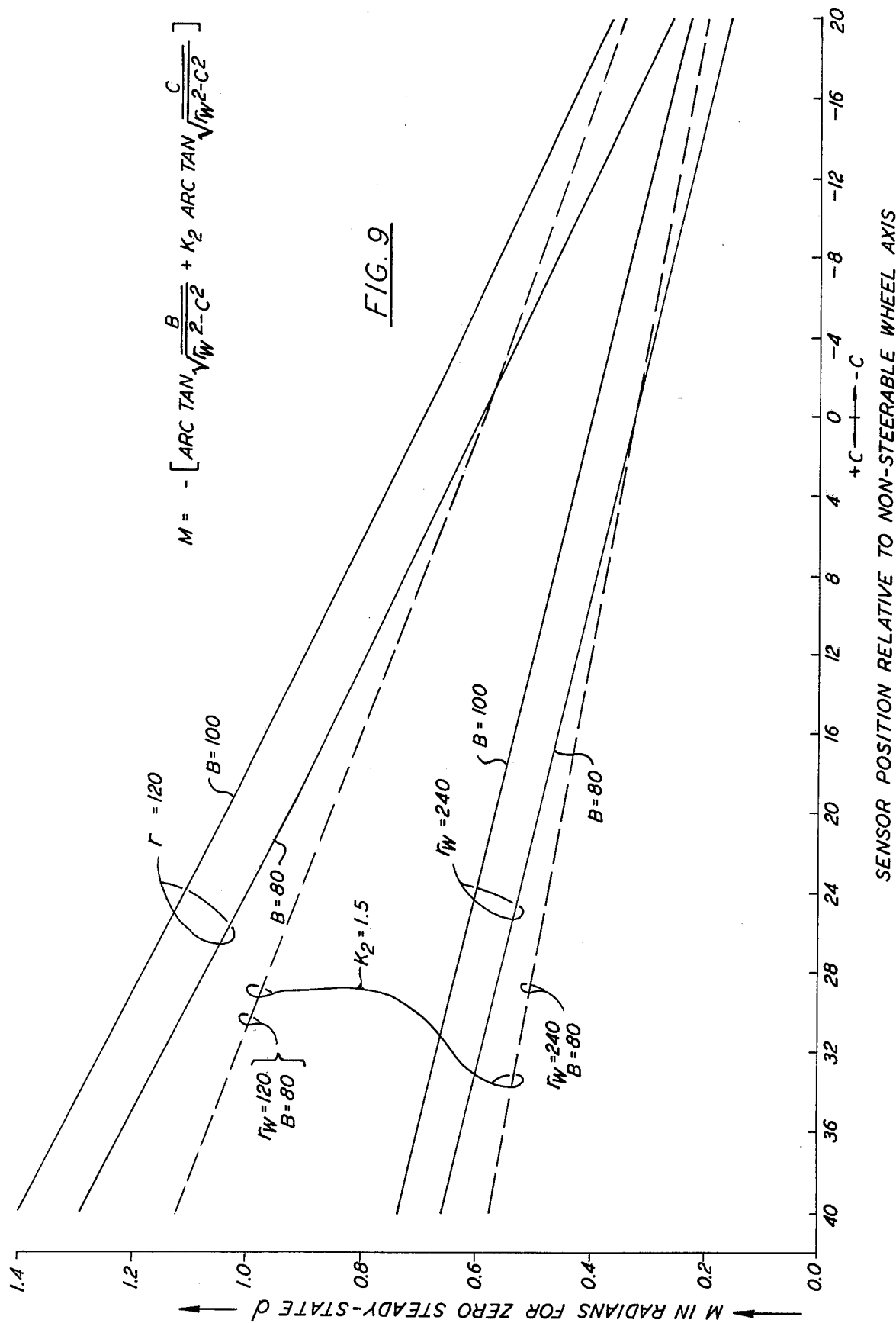
Figure 10:
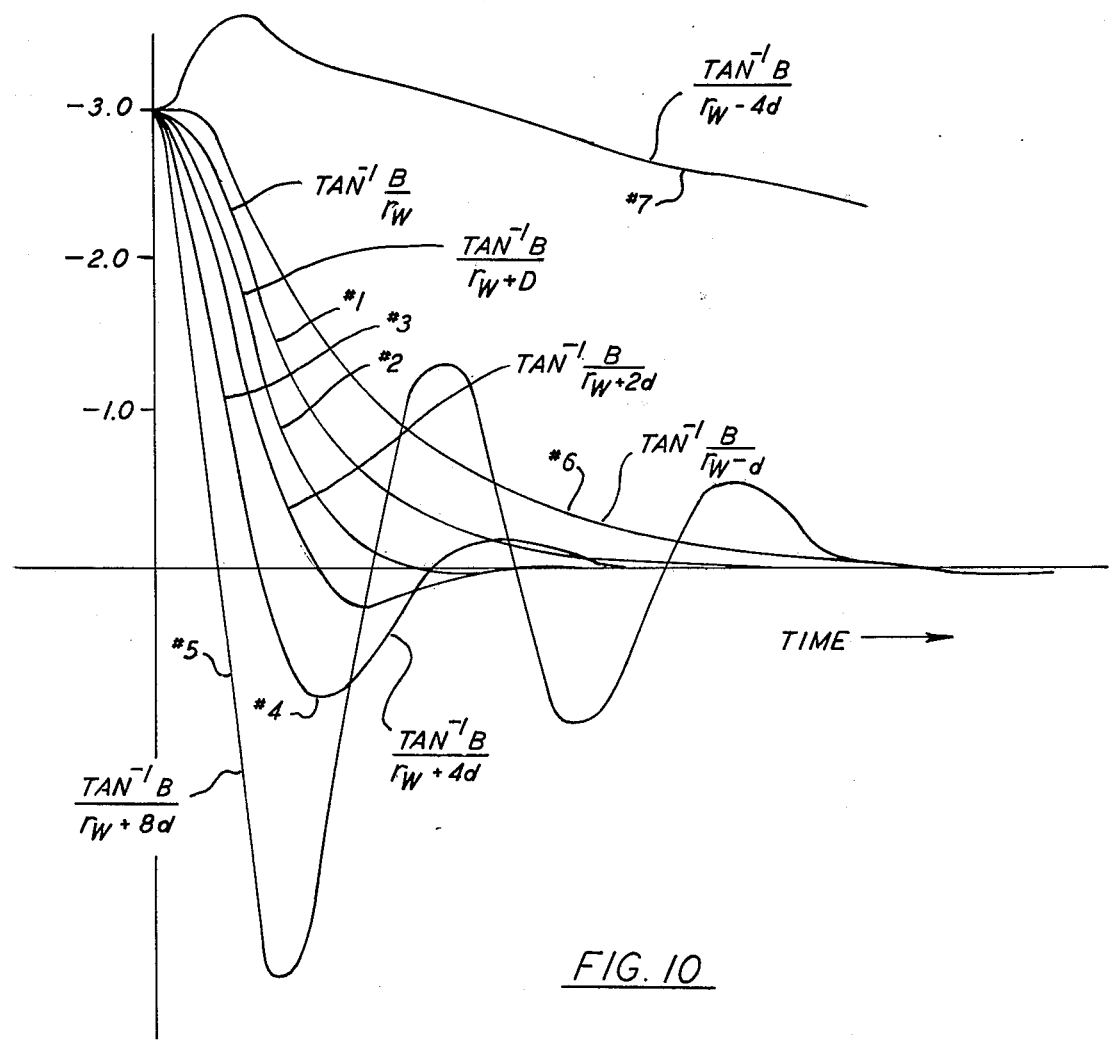
Figure 10A:
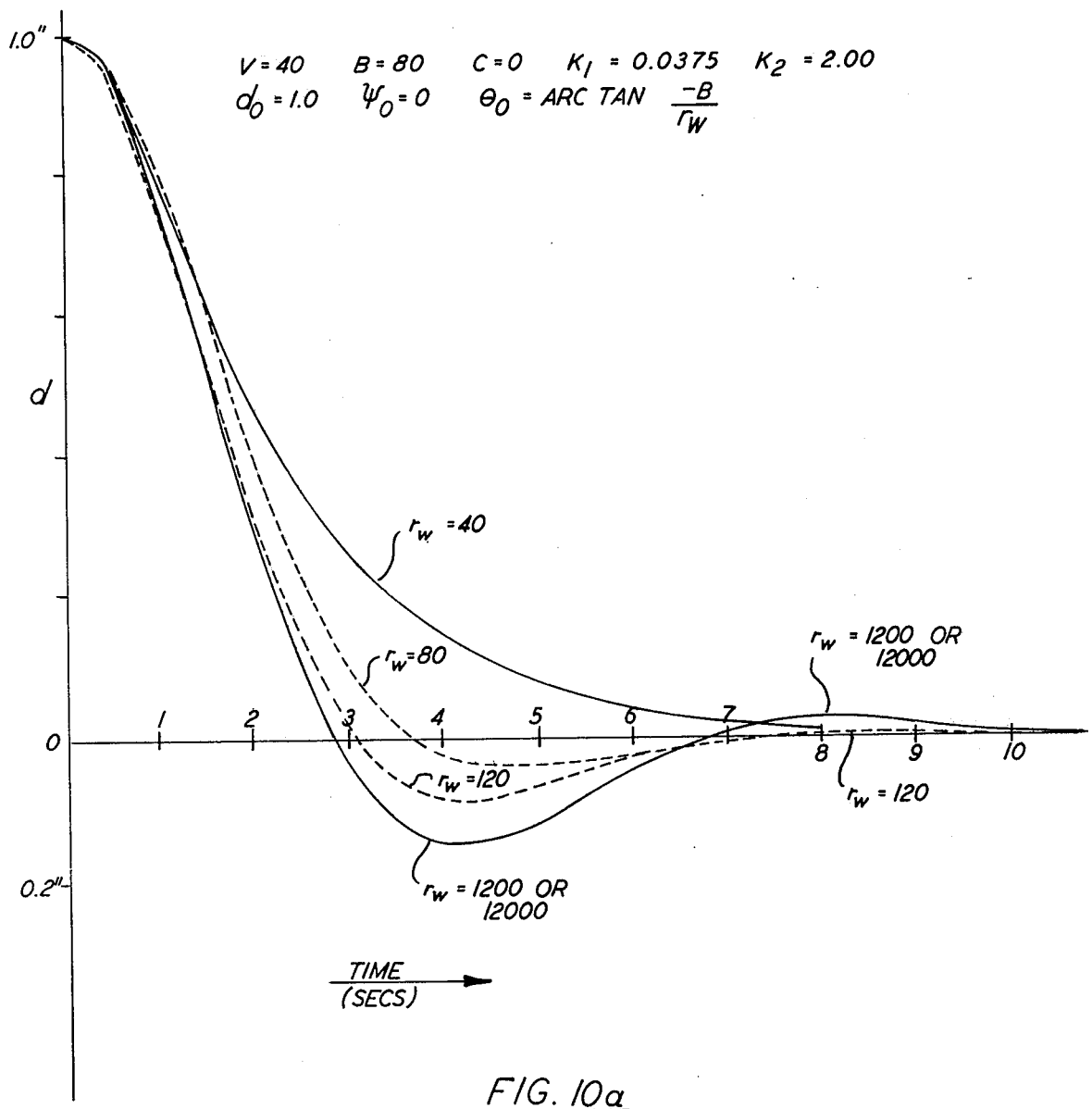

FIGS. 9, 10 and 10a contain graphs illustrating certain principles of the invention.

Figure 1:
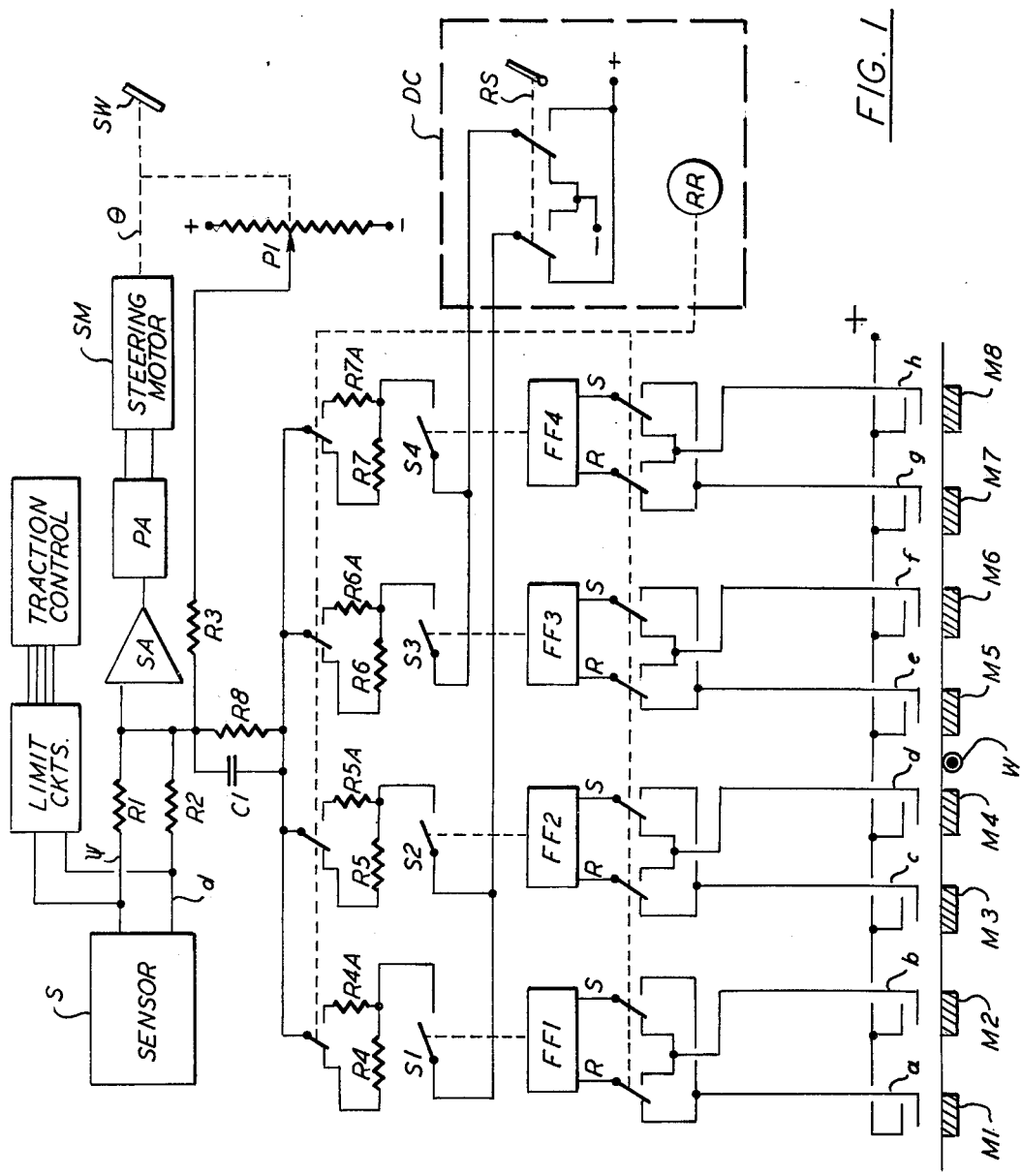
FIG. 1 is a schematic diagram, partially in block form, illustrating one form of the present invention.
Figure 11A:
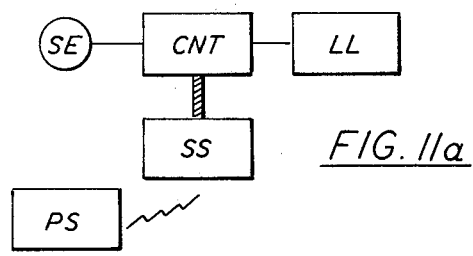
Figure 11B:
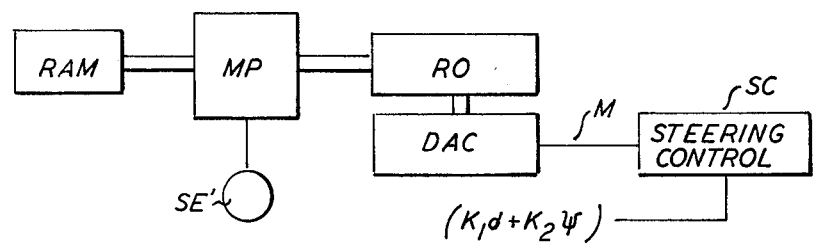

FIGS. 11a and 11b are block diagrams illustrating two further modifications which may be made to the system shown in FIG. 1.

Figure 12:
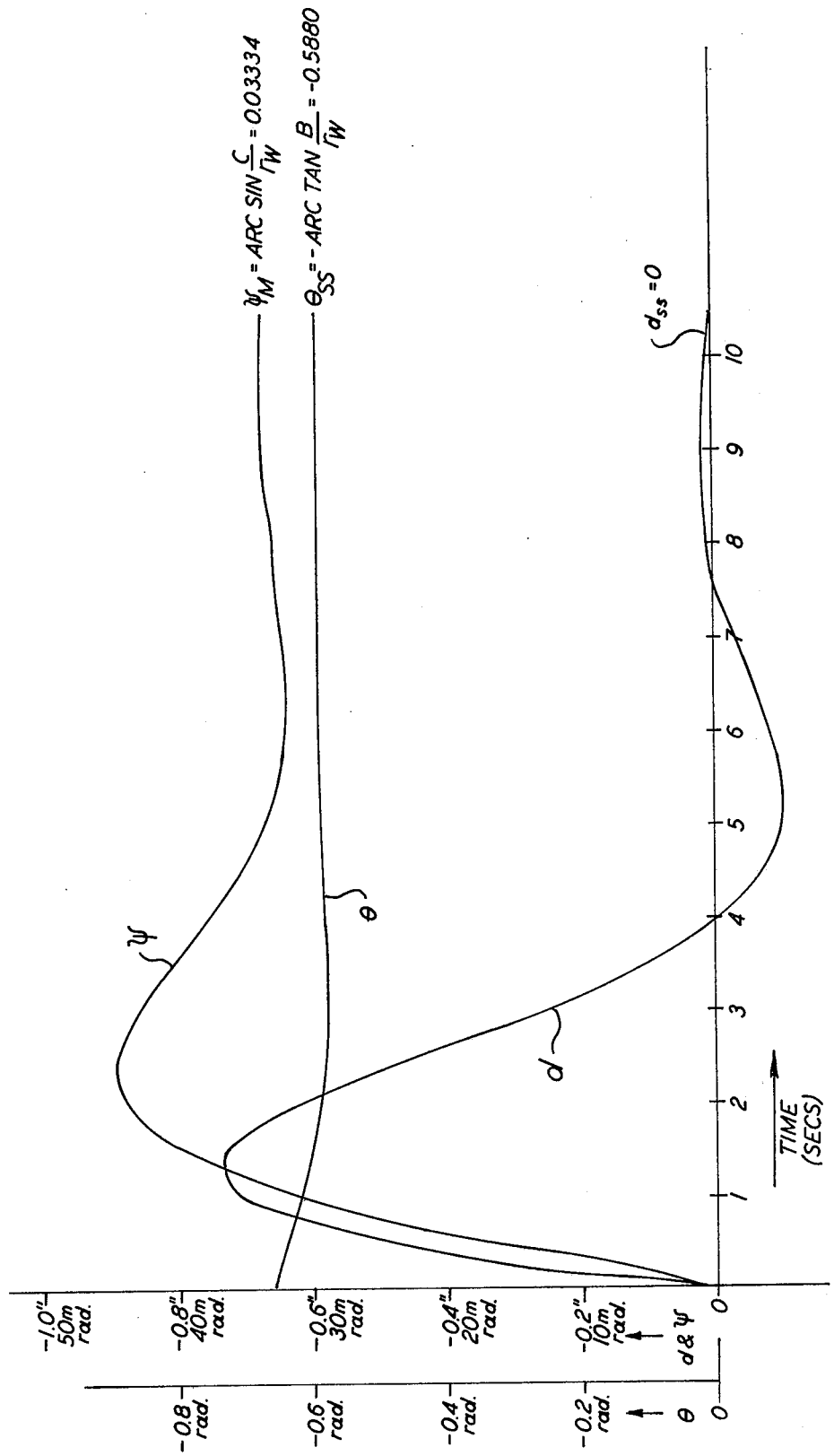

FIG. 12 is a further graph useful in understanding the invention.

In FIG. 1 a vehicle-carried sensor assembly S provides a pair of output signals commensurate with heading $\psi$ and displacement d relative to a guidewire. The sensor assembly S may take any one of various forms of sensor assembly shown in my prior application, for example, or any equivalent form of assembly from which similar signals commensurate with heading and displacement or a function thereof are provided. The signals are applied via command signal forming means comprising scaling resistors R1 and R2 to a summing amplifier SA to provide the command signal to a steering motor servomechanism, with the values of R1 and R2 determining the relative scale factors referred to as $K_2$ and $K_1$. Summing amplifier SA also receives a position feedback signal from potentiometer P1 applied via scaling resistor R3. The output signal from amplifier SA is amplified by power amplifier PA, the output of which drives a steering motor SM to position the steerable wheel SW of the vehicle and position the wiper arm of potentiometer P1. As fully described in my prior application, the steering servomechanism continuously positions the steerable wheel to a steering angle $\theta$ commensurate with the command signal applied via R1 and R2. The heading and displacement signals are also applied to limit circuits LC which function to decelerate and stop the vehicle, in a manner shown in my prior application, if heading deviation angle $\psi$ or lateral displacement d exceed predetermined values. Means shown in my prior application which may be used to reverse the sign or sense of the ψ term for an opposite direction of travel are not shown in FIG. 1 but is assumed to be used. FIG. 1 as thus far described does not differ from systems shown in my prior application.

In accordance with the present invention, turning control means are provided to apply one or more further signal components as part of the command signal when turns are to be executed. In FIG. 1 such means are shown as including a group of switches S1 to S4 each arranged when closed to apply a respective predetermined signal via a respective scaling resistor of the group R4 to R7, thereby superimposing a predetermined constant signal on the usual command signal. While shown as mechanical switches for sake of simplicity, switches S1 to S4 preferably comprise electronic switches operated by respective latches FF1 to FF4. Each latch may comprise a simple set-reset flip-flop, for example. Each latch is shown with its set and reset input lines connected to be energized by respective closures of a pair of magnetic reed switches. A multi-pole reversing relay RR is operative to interchange the connections of each pair of reed switches to a given latch. In one form of the invention, the reed switches are spaced laterally apart on the vehicle near the floor so as to be selectively operated by floor-embedded permanent magnets which are spaced relative to the guidewire at the entrances and exists to and from turns in the guidewire, and in some cases at other points where guidewire curvature changes. In FIG. 1 the magnet positions are shown spaced symmetrically on opposite sides of the guidewire W. Though eight magnets are shown in FIG. 1, only one magnet need be provided at a particular point along the guidewire.

Figure 2:
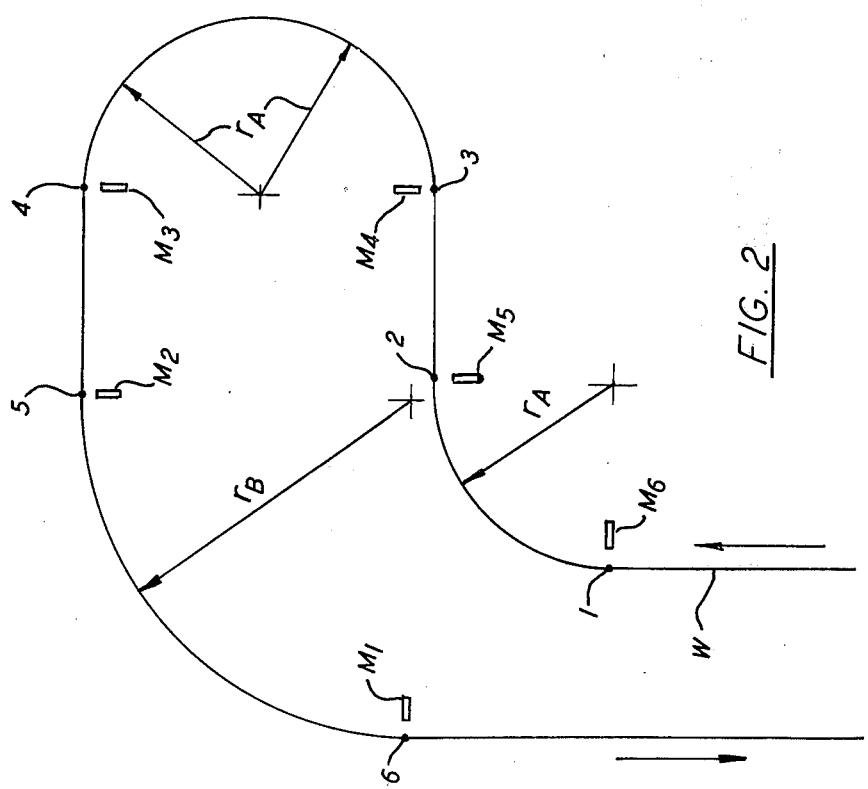
FIG. 2 is a plan view of a section of guidewire useful in illustrating the operation of the apparatus of FIG. 1.

Referring to FIG. 2, there are four distinct travel modes in which a wheel-steered vehicle might travel along such a section of guidewire. The vehicle can travel either with its non-steered wheels leading its steered wheels, or with its steered wheels leading its non-steered wheels. For convenience, vehicle travel with the non-steered wheels leading the steerable wheel will be called the forward direction. Thus the vehicle can travel forward in the direction of the arrows, forward in the direction opposite to the arrows, reverse in the direction of the arrows and reverse in the direction opposite to the arrows.

Assume a vehicle equipped as in FIG. 1 is to traverse the guidewire W shown in FIG. 2 in the direction shown by the arrow, and assume firstly that the vehicle is to travel forwardly, or with its non-steered wheels leading its steerable wheels. When the vehicle travels forwardly, a direction-control device DC maintains relay RR in the position shown. Magnets may be embedded alongside the wire as diagrammatically shown in FIG. 2. As the vehicle reaches point 1 at which it is to begin a 90 degree turn to the right, a magnet M6 spaced like magnet M6 in FIG. 1 operates reed switch f to set latch FF3, closing switch S3 to superimpose a negative signal of predetermined magnitude upon the command signal from the sensor; then later, as the vehicle reaches point 2, a magnet M5 operates reed switch e to clear latch FF3, removing the signal theretofore applied via R6 and R8. As the vehicle reaches point 3 where it is to make a 180° left turn, magnet M4 operates reed switch d to set latch FF2, closing switch S2 to apply a positive signal via R5 and R8 to the steering servo, and when the vehicle reaches point 4 magnet M3 operates reed switch c to clear latch FF2. It should be noted that the polarity of the signal applied via R5 while a left turn is progressing is opposite in sense to that applied via R6 while a right turn is being made. However, since the turn between points 3 and 4 has the same radius of curvatuve as that between points 1 and 2, resistors R5 and R6 apply signals of equal magnitude to the steering servo. As the vehicle reaches point 5 magnet M2 operates reed switch b to set latch FF1, closing switch S1 to apply a positive signal via R4, and at point 6 magnet M1 operates reed switch a to clear latch FF1 and open switch S1. Because the radius of curvatuve (shown as $r_B$) of the guidewire between points 5 and 6 is larger than those (shown as $r_A$) for the other turns, resistor R4 applies a smaller signal to the servo than do resistors R5 and R6, for reasons which will become clear below. When latch FF4 is set by operation of reed switch h, switch S4 applies a signal via R7 which is equal in magnitude but opposite in polarity to that applied by closure of switch S1. As will be explained below, for vehicles having their sensors on a non-steered wheel axis the magnitude of the signal added when a turn is made should be substantially the amount which will turn the steerable wheel to a steering angle $\theta$ derived from the relationship: $\tan \theta = B/r_w$, where B is the wheelbase of the vehicle and $r_w$ is the radius of curvature of the guidewire, and if their sensors are displaced from the non-steered wheel axis a variant of that term is used. The added signal should vary during the turn if the guidewire curvature varies during the turn.

One should note that during the above-described travel, the even-numbered magnets operated to set various latches and the odd-numbered magnets operated to clear various latches. Now assume the vehicle is traversing the path of FIG. 2 in a direction opposite to the arrow, but with the non-steerable wheels again leading the steerable wheels. The spacing relationships between the reed switches on the vehicle and the magnets encountered along the guidewire then will be opposite to those shown in FIG. 1, and could be shown by re-numbering the magnets in FIG. 1, with magnet M1 on the right and magnet M8 on the left. The even-numbered magnets then will clear latches and the odd-numbered magnets then will set latches. For example, while magnet M1 operated reed switch a to clear latch FF1 and remove a positive input to the servo at the exit from a left turn, while proceeding in the direction of the arrow as heretofore described, during the opposite direction of travel, with the non-steered wheels leading, magnet M1 will operate reed switch h to set latch FF4, close switch S4 and apply a negative input via R7 for a right turn at the entrance to the turn, and then magnet M2 will operate reed switch g to clear latch FF4 at the exit from that turn. Thus the symmetrical magnet arrangement allows the vehicle to progress "non-steered wheels first" in either direction along the wire shown in FIG. 2, with the reed switches appropriately operating the latches at entrances to and exits from the turns.

The invention does not require the use of symmetrical magnet spacing, and in FIG. 1 a manual reversing switch RS is shown. Switch RS is adapted to reverse the polarities of the added command signal components if a vehicle is re-oriented to face in an opposite direction over the guidewire. With the vehicle oriented in a given direction over a given curved guidewire, the signal superimposed on the command signal should have the same sense or polarity whether the vehicle is traveling forwardly (non-steered wheels leading) in one direction or instead traveling in reverse in the opposite direction.

Direction controller DC translates relay RR from the position shown while travel is occurring with the steerable wheel or wheels leading. The direction controller DC may take a variety of forms. For example, it may comprise a tachometer generator operated by rotation of a vehicle wheel and operative to provide an output having a polarity dependent upon whether non-steered or steered wheels are leading, with relay RR switched in accordance with such polarity; or, in some applications relay RR may be controlled directly by an operator's manual direction control switch. Relay RR may comprise further contacts on the same relay (not shown) used to invert the sense of the heading signal as shown in my copending application. The direction controller relay RR interchanges the reed switch connections to the latches for changes between forward and reverse travel. Assume that the vehicle proceeds forwardly in the direction of the arrow past point 1, so that magnet M6 causes latch FF3 to be set as previously described, but that the vehicle stops before reaching point 2 and then is driven in reverse, against the direction of the arrows, back past point 1. While magnet M6 had operated moments before to set latch FF3, it now will operate again to clear that latch as required. Thus it will be seen that the vehicle can operate over such a guidewire in any one of the four possible directional modes, which is an important feature for some applications. While the floor magnets operative during right turns are shown on the right side of the guidewire, and vice versa in FIG. 2, that is by no means necessary and an opposite relationship could be used. And while magnets associated with larger-radius turns are shown laterally spaced further from the guidewire than those for smaller-radius turns, an opposite arrangement could instead be used. It is very important to recognize, however, that the use of floor-embedded magnets is only one of numerous means which may be employed to cause application and removal of added signals to the steering servo as turns are entered and exited. Pneumatic, hydraulic or mechanical wheel trip devices, or light-actuated, magnetic, radio-frequency or mechanical presence detectors can be arranged to transmit signals to a vehicle when the vehicle arrives at any of the points at which the reed switches are operated in FIG. 2, and detectors on the vehicle can operate switches S1 to S4 to provide equivalent operation. In some systems the switching may be controlled by a remote computer. In some systems where all turns in the guidewire have substantially the same radius, only one magnitude of added signal need be superimposed on the sensor-provided command signal, with a sense or polarity dependent upon the direction of the turn being made.

In FIG. 1 relay RR is shown connected to substitute scaling resistors R4A to R7A for resistors R4 to R7, respectively, when reverse travel occurs. Such substitution of scaling resistors to vary the signals applied to steer the vehicle becomes desirable in connection with vehicles having their sensors mounted appreciable distances from the axes of their non-steered wheels, but otherwise may be omitted for reasons made clear below. In FIG. 1 a lead capacitor C1 is shown connected in parallel with resistor R8 through which the added signals are applied. The use of such a lead circuit tends to be beneficial in some applications if the bandwidth of the steering servo is marginal, although it should be noted that lag in the servo response can instead be compensated for by proper placement of the floor magnets (or equivalent switching devices) relative to the points in the guidewire where curvature changes.

Figure 3:
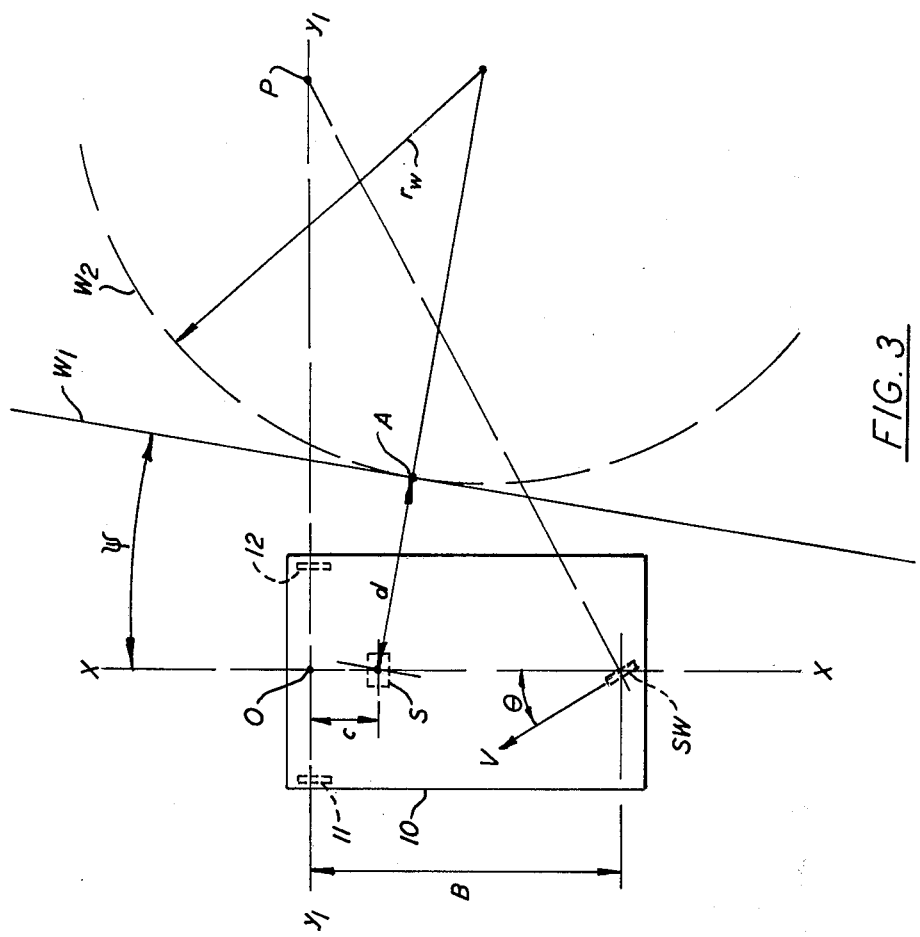
FIG. 3 is a geometrical plan view diagram of a sensor-carrying vehicle useful in understanding the operation of the invention.

In aid to further understanding of the present invention, reference should now be had to the plan view diagram of FIG. 3 wherein vehicle 10 is supported at one end by a pair of non-dirigible load wheels 11, 12 spaced laterally apart on a lateral axis y1 at equal distances from a longitudinal axis x—x, and supported near its other end on a steerable wheel SW located longitudinally a wheelbase distance B from the load wheels. Angles and angular rates will be deemed to be positive in the clockwise direction. If steerable wheel SW moving at velocity V is turned at an angle $\theta$ from the x axis, $\theta$ having a negative value in FIG. 3, the vehicle turns about a center-point of rotation P located at the intersection of axis y1 and a line perpendicular to the wheel SW travel direction. In FIG. 3 the vehicle x axis is shown situated at an exaggerated heading angle $\psi$ with respect to a straight section of an imaginary guidewire $W_1$. The vehicle x axis is also situated at the same heading angle $\psi$ relative to an infinitesimal length of a curved guidewire $W_2$ to which $W_1$ is tangent at point A. Wire $W_2$ has a radius of curvature $r_w$. A sensor assembly S is shown mounted on the x—x axis at a distance c from the load wheel axis y1. My prior application explains how, using several small-angle approximations, one can derive the following characteristic equation representing the steering dynamics of the vehicle during travel along a straight guidewire:

$$p^2 + \frac{(K_2 - K_1 c)V_p}{B} + \frac{K_1 V^2}{B} = 0 \tag{1}$$

wherein p is the differential operator d/dt, and $K_1$ and $K_2$ are the mentioned system sensitivities to lateral displacement and heading errors, respectively. The application further shows that for travel along a straight guidewire the system damping ratio is given by:

$$\zeta = \frac{K_2 - K_1 c}{2 \sqrt{K_1 B}} \tag{2}$$

and the system natural frequency given by:

$$\omega_n = V \sqrt{\frac{K_1}{B}} \tag{3}$$

In a typical system constructed in accordance with those principles, a vehicle having a wheelbase B of 80 inches might use a $K_1$ factor of 0.0125 radian per inch (per 2.54 cm.) and a $K_2$ factor of 2.0 radian per radian providing critical damping (if dimension c is zero) and providing a natural frequency of 1.5 radians per second at a maximum speed of 120 inches per second (304.8 cm. per second) along a straight wire. However, if the guidewire has a curvature radius $r_w$ of 120 inches (304.8 cm.), for example, the system using those gain or sensitivity values cannot follow the wire; and instead, upon encountering such curvature it will experience a large lateral displacement which will stop the vehicle. With the values assumed, the vehicle would seek a position at a radial distance of 37.58 (95.45 cm.) inches from the curved guidewire, a far greater distance than that at which any usual sensor assembly is operative. It can be shown that the theoretical radial distance which the vehicle would seek is given by:

$$d_{ss} = \frac{-1}{K_1} \arctan \frac{B}{r_w - d_{ss}} \quad (4)$$

That radial distance can be greatly reduced by greatly increasing the lateral displacement sensitivity factor $K_1$ when a turn is encountered, as by drastically decreasing resistance R2 in FIG. 1, for example. However, greatly increasing the $K_1$ factor tends to markedly decrease the system damping factor, and sometimes result in oscillations about the guidewire, unless the heading sensitivity factor $K_2$ is simultaneously increased very substantially, and increasing $K_2$ very substantially above a value such as 2.0 in typical applications tends to be impractical, at least with inductive sensors, since anomalies in the magnetic field caused by concrete reinforcing and other metal objects then would cause large steering errors.

In embodiments of the invention wherein dimension c in FIG. 3 is zero, the rate of change of heading $\psi$ of the vehicle relative to the guidewire can be deemed to comprise the algebraic sum of a rate of change of heading of the vehicle relative to a theoretical straight wire, plus a rate of change of heading of an actual curved guidewire relative to the straight wire, as expressed, for example, in the following approximate equation:

$$p\psi = (-V \sin\theta/B) - (V \cos\theta/r_w) \quad (5)$$

so that heading can be expressed as:

$$\psi = -\frac{V}{p}\left(\frac{\sin\theta}{B} + \frac{\cos\theta}{r_w}\right) \quad (6)$$

Lateral displacement d can be expressed by:

$$d = V \cos\theta \sin\psi/p \quad (7)$$

and if $\psi$ is constrained to small angles, instead expressed as:

$$d = -\frac{V^2}{p^2}\cos\theta\left(\frac{\sin\theta}{B} + \frac{\cos\theta}{r_w}\right) \quad (8)$$

It is important to note in equations (5), (6) and (8), that heading deviation $\psi$ and lateral displacement d both may be zero and remain zero if and when $$\left(\frac{\sin\theta}{B} + \frac{\cos\theta}{r_w}\right) = 0,$$

or, in other words, when $\tan\theta = -B/r_w$. If the added signal applied to the steering servo during a turn is designated M, various systems of the present invention can be deemed to be using the following command equation:

$$-\theta + M + K_2\psi + K_1 d = 0 \quad (9)$$

Thus, application of an added signal M which turns the steerable wheel to an angle given by $\theta = -\arctan(B/r_w)$ allows heading and displacement to be and to remain zero simultaneously during a turn. If the dimension c is not zero, a variant of that value mentioned below may be used to provide zero steady-state lateral displacement during a turn, but a finite heading deviation will persist during steady-state travel around a turn, and a temporary lateral displacement will occur before steady-state conditions are reached during a turn.

It is important to note that if a nearly correct M term is applied as a vehicle negotiates a turn, the $\psi$ and d error signals from the sensor assembly will not vary substantially from those experienced during high-speed travel along a straight wire, and thus the limit circuits which control vehicle deceleration and/or stopping can continue to function exactly as they do during high-speed straight-wire travel.

The curvature of guidewire paths in a warehouse or the like can be predetermined of course, so that arc tan $-B/r_w$ values for various turns can be readily calculated for any guided vehicle. Their precise values will differ, of course, for vehicles having different wheelbase distances (B) and sensor positions (c). However, no floor-carried control apparatus is dependent upon such values, so different vehicles having numerous different wheelbases and sensor positions may be used in the same warehouse.

Figure 4:
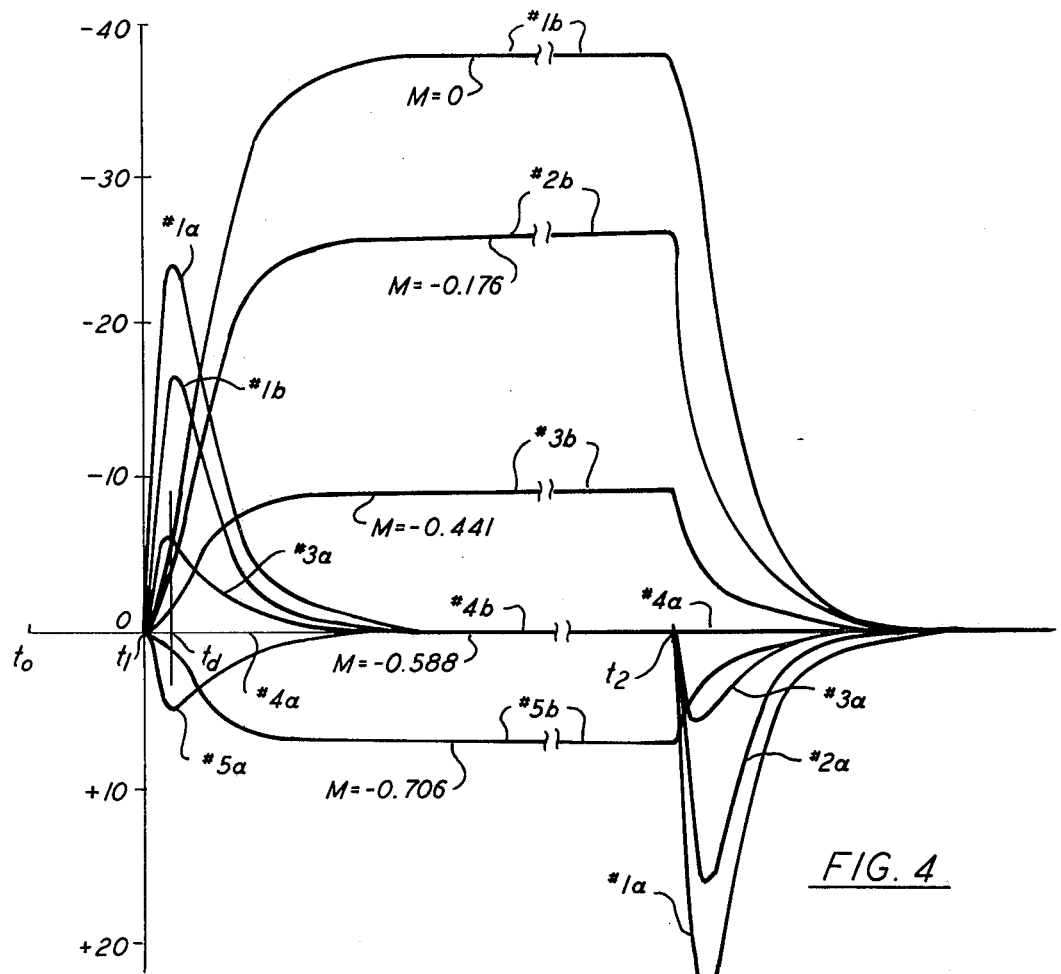
FIGS. 4 and 5 are graphs useful in understanding problems associated with the prior system and the improvements obtainable with the present invention.

The curves of FIG. 4 may be helpful in better understanding the invention. For each of the plots shown it is assumed that a vehicle is following a straight guidewire from time $t_o$ to time $t_1$. At time $t_1$ it encounters a curved section of guidewire which curves in one direction. At time $t_2$ the vehicle reaches the exit from the turn where the guidewire becomes straight again. Vehicle speed is assumed to be constant and dimension c zero.

Curves #1a and #1b illustrate the theoretical operation of the prior system wherein no change is made in the command signal as a curve is encountered, with an assumption that the prior system is arranged to be operative over extreme ranges of heading and displacement not usable in practice. At time $t_1$ as the vehicle first encounters the turn, a large heading error builds up and then decays to zero as a steady-state condition is reached sometime prior to $t_2$. However, the displacement error builds up as shown in curve #1b, and then remains at a maximum value as the steady-state condition is reached. At time $t_2$ when the vehicle reaches the point where the guidewire straightens out, an opposite-sense heading error builds up and then decays as shown by curve #1a, and the displacement error decreases as shown at #1b. Curve #1a is symmetrical about the abscissa axis. It is to be understood that if heading ($K_2$) and displacement ($K_1$) sensitivity values are used so as to provide close tracking of a straight wire at high speed, the heading deviation and lateral displacement values will become much, much greater than what can be tolerated, and that the vehicle limit circuits would shut down the vehicle long before the extreme values plotted could be achieved. If the vehicle travels at a lower speed than that assumed for curves #1a and #1b, the heading deviations will not become as great as those shown by curve #1a, but the lateral displacement d would still seek the same extreme value shown by curve #1b, and it would build up at even a greater slope than that shown by curve #1b.

In FIG. 4 curves #2a, #3a, #4a and #5a and curves #2b, #3b, #4b and #5b represent operation with increasing amounts of the added command signal component applied to the steering servo at time $t_1$ and removed therefrom at time $t_2$. Curves #2a and #2b represent operation when the added component M equals about 30% of the value arc tan $(B/r_w)$, curves #3a and #3b about 75% of arc tan $(B/r_w)$, curves #4a and #4b (actually straight lines) for M=arc tan $(B/r_w)$, and curves #5a and #5b for M=about 120% arc tan $(B/r_w)$. The two latter curves show that applying an added component M which is too large tends to cause heading and displacement errors opposite in sense to those which occur if the added component M is too small. All of the curves in FIG. 4 assume use of $K_1$ and $K_2$ values which provide critical damping for sake of simplicity, so that overshoots which would occur with an underdamped system do not appear. One should note, however, that since no system disturbance occurs as a turn is made if the proper M value is added to the command signal, no overshooting will occur, even if the system is under-damped, assuming dimension c is zero.

It should be apparent now that if the guidewire curvature changes in step fashion, as is assumed in FIG. 2, the component M should be applied in step fashion exactly when the vehicle sensor encounters a curve and removed exactly when it leaves the curve to return to straight wire, to the extent possible; but it also should be noted that some timing error can be tolerated. The heading and displacement errors which would occur if application of the M component were delayed after time $t_1$ until time $t_d$ can be taken from curves #1a and #1b.

Figure 5:
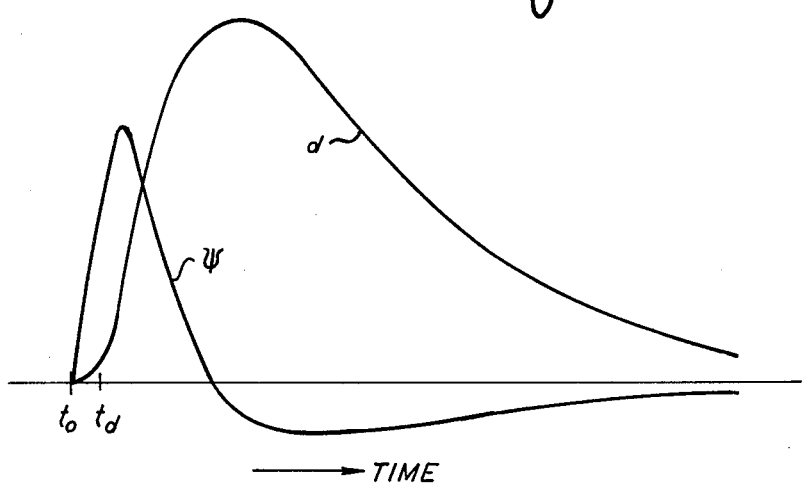

If an M term of magnitude arc tan $(B/r_w)$ is applied slightly later than when the vehicle encounters a turn, so that some lateral displacement builds up, that initial lateral displacement will not persist throughout the remainder of the turn, but instead will be driven to zero, with the same rate of decay as a similar displacement would be corrected during travel of the system of my prior application along a straight guidewire, as is illustrated by curve #1 in FIG. 5, which also assumes critical damping.

If the M term is applied exactly at the start of a turn, but is applied with an incorrect magnitude, the system of the invention will seek a position laterally displaced from the guidewire at a distance $d_{ss}$ given by:

$$d_{ss} = \frac{-1}{K_1} \left( \text{arc tan} \frac{B}{r_w - d_{ss}} + M \right) \quad (14)$$

Equation (14) assumes dimension c is zero.

The rate at which a vehicle will approach steady-state conditions if the M term is not the ideal value, and whether the vehicle will overshoot and oscillate about the steady-state conditions before settling depends upon the system damping, which can be approximately determined by equation (2).

Figure 6A:
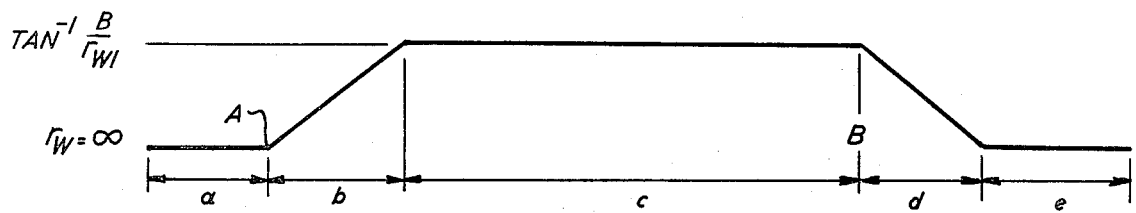
FIG. 6a is a plot illustrating the variation of the curvature of a section of guidewire which may be used in an alternative form of the invention.
Figure 6B:
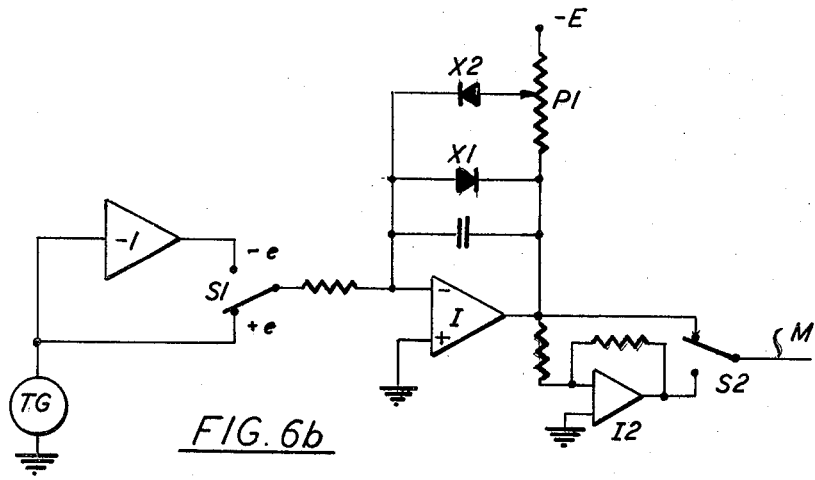

In some applications it is desirable that the guidewire curvature not change in step function fashion, but rather change gradually from one value to another. With such guidewire arrangements, the M signal should gradually build up and decrease as the guidewire radius decreases and increases, i.e. the guidewire curvature increases and decreases. FIG. 6a is a graph illustrating the variation in curvature of a sample guidewire along successive sections of its length. The curvature is zero along wire sections a and e, has a constant value along section c, and increases and decreases along sections b and d, respectively. In FIG. 6b a tachometer generator TG driven by the vehicle steerable wheel SW supplies a pair of opposite-polarity voltages to terminals +e and −e. If the vehicle is commanded to travel at a predetermined speed during the turn, the tachometer generator can be eliminated and fixed voltages instead applied to those terminals. While the vehicle is traveling along a straight section of wire, such as section a, switch S1 applies a positive voltage from terminal +e to integrator I, but diode X1 prevents the integrator output from becoming negative, so that it remains at zero volts. When the vehicle reaches point A in FIG. 6a switch S1 is transferred to apply the voltage at terminal −e to integrator I, so that the integrator output gradually builds up like the curvature shown at section b in FIG. 6a. The integrator output increases until it reaches a limit value corresponding to the curvature of section c of the guidewire. When the output voltage reaches a positive value determined by the setting of potentiometer P1 and the −E value applied to that potentiometer, diode X2 conducts to prevent further increase in the integrator output. Assuming the curvature of section c of the wire is $r_{wo}$, potentiometer P1 is set so that limiting occurs when the output voltage from the integrator is equal to a voltage representing arc tan $(B/r_{wo})$. When vehicle travel reaches point B in FIG. 6a, switch S1 is switched pack to the −e terminal. The output voltage from the integrator then will decrease in the manner that curvature decreases over section d of the wire. Thus the output of integrator I follows the curvature profile shown in FIG. 6a, and it is applied as the added M signal to the vehicle steering servo, either directly, or inverted by means of unity-gain inverter I2. Switch S2 is switched to one or the other of its positions when the vehicle reaches point A in dependence upon whether the turn to be executed is a right turn or a left turn. The switches in FIG. 6b can be controlled via magnets spaced along the guidewire or by any of the numerous other techniques mentioned.

Figure 6C:
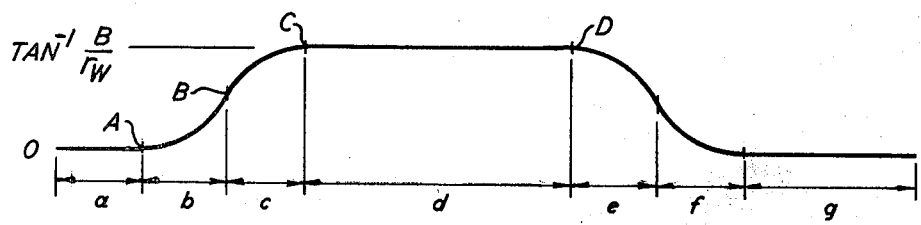
FIG. 6c is a plot illustrating the variation of curvature of a section of guidewire which may be used in another form of the invention.
Figure 6D:
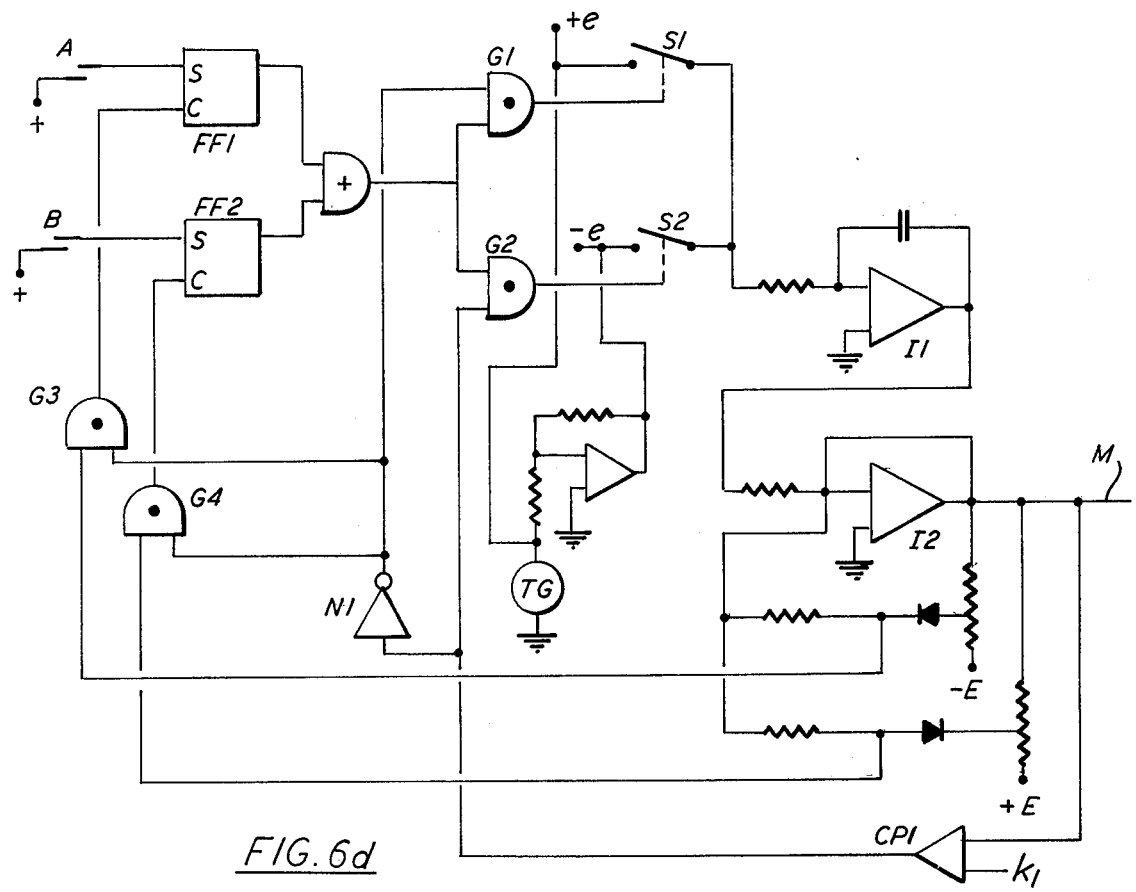
FIG. 6d illustrates a modification which may be made to the system of FIG. 1 to accommodate its use with a guidewire having a curvature variation of the type illustrated in FIG. 6c.

Vehicle accelerations can be further lessened if guidewire curvature varies as per FIG. 6c, using apparatus such as that shown in FIG. 6d. A tachometer generator TG and an inverting amplifier provide a pair of opposite-sense voltages commensurate with vehicle speed at terminals +e and −e, and as in FIG. 6b, fixed voltages may be substituted at these terminals if the vehicle is commanded to travel at a predetermined speed during the turn. When the vehicle reaches point A in FIG. 6c, a reed switch A operated by a floor magnet or the like closes to set latch FF1. Because the output of integrator I2 then will be zero, and specifically, less positive than a value $k_1$, the comparator CP1 output will be logic zero, so that the set output of latch FF1 and the output of inverter N1 enable gate G1, thereby closing switch S1 to apply the +e voltage to integrator I1. Then as the vehicle travels along section b of the wire of FIG. 6c the output integrator of I1 goes negative linearly and the output of integrator I2 rises positively, and parabolically. When the I2 output exceeds the $k_1$ value, comparator CP1 switches, disabling gate G1 and opening switch S1, and enabling G2 to close switch S2, thereby applying the −e voltage to integrator I1. Then as the vehicle travels along section c of the wire profiled in FIG. 6c, the integrator output rises linearly toward zero, while the output of integrator I2 increases further positively, but with decreasing slope. When the vehicle reaches point C, the output of integrator I1 is near zero and that of integrator I2 is approximately equal to arc tan $(B/r_{wo})$. A positive limiter circuit prevents the output of I2 from exceeding arc tan $(B/r_{wo})$. When the limiter circuit operates gate G3 is enabled, thereby clearing latch FF1, so that no input is applied to integrator I1 as the vehicle traverses section d of the wire in FIG. 6c.

When the vehicle reaches point D, switch B operated by a floor magnet or the like sets latch FF2. With that latch set and comparator CP1 providing logic 1, gate G2 is enabled, connecting the $-e$ input to integrator I1, so that the I1 output rises linearly from zero and the I2 output decreases parabolically, in the manner of section e of the profile in FIG. 6c. As the I2 output decreases below the $k_1$ value, the resulting logic 0 from comparator CP1 disables gate G2 and enables gate G1, thereby applying the $+e$ input to integrator I1. The I1 output then decreases linearly toward zero and the I2 output parabolically toward zero. As the negative limiter on I2 operates it enables gate G4 and clears latch FF2, and the system is then in condition for straight-line travel. The output of integrator I2 is used as the M signal, and though not shown in FIG. 6d, it will be applied via a direction-determining circuit like that involving inverter I2 and switch S2 in FIG. 6b. The $k_1$ value ordinarily will be one-half of the arc tan $(B/r_{wo})$ value. Integrator I2 may be provided with added drift-prevention refinements, if desired, such as circuits which gently tend to drive it toward zero when its output is near zero, and gently tend to hold it at its arc tan $(B/r_{wo})$ limit value when its output is near that limit value. An alternate implementation could use a microprocessor and a digital function generator.

While the invention has been described in connection with systems of my prior application wherein separate heading deviation and lateral displacement signals are obtainable from the sensor assembly, one should note that the invention is applicable as well to various other systems, such as that shown in U.S. Pat. No. 4,043,418, wherein a steering command signal which is a complex function of both heading and displacement is used to position a steering wheel.

While described in connection with inductive sensing of a current-carrying guidewire, it will become apparent to those skilled in the art that the present invention is readily applicable to various other path-sensing systems, such as those wherein photosensors sense light reflected from a floor-carried reflective stripe, for example, or those using capacitive sensing of a voltage-carrying guidewire.

Equations (5) through (8) involve some approximations, and reference to more rigorous equations may afford more insight into the invention and will lead to an appreciation of some refinements. In FIG. 3 angles and angular rates are assumed to be positive in the clockwise direction and distances to be positive to the right of the curved guidewire. Thus angles $\psi$ and $\theta$ are negative in FIG. 3, and distance d is negative. The distance c is deemed positive in FIG. 3. The guidewire radius of curvature $r_w$ is deemed positive when it curves clockwise or to the right as in FIG. 3, and vice versa. By rather laborious trigonometrical analysis and manipulation one may derive the following expressions for rate of change of heading of the sensor, or $\omega_s$, and the rate of change of lateral displacement, for a steerable vehicle such as that diagrammatically shown in FIG. 3:

$$\omega_s = -V\left[\frac{\sin\theta}{B} + \frac{1}{r_w - d}\left(\cos\theta\cos\psi - \frac{c}{B}\sin\theta\sin\psi\right)\right] \quad (15)$$

$$\frac{dd}{dt} = V\left(\sin\psi\cos\theta + \frac{c}{B}\cos\psi\sin\theta\right) \quad (16)$$

By setting (15) and (16) equal to zero one can find that the steering wheel angle $\theta$ during steady-state travel around a curve is given by:

$$\tan\theta = \frac{-B\cos\psi}{r_w - d - c\sin\psi} = \frac{-B}{c}\tan\psi \quad (17)$$

Solving expression (17) to eliminate $\theta$, one finds that during steady-state travel along a curved wire:

$$\sin\psi = \frac{c}{r_w - d} \quad (18)$$

Equations (17) and (18) may be combined to provide:

$$\theta = \arctan\frac{-B}{\sqrt{(r_w - d)^2 - c^2}} \quad (19)$$

Referring to FIG. 3, it should be noted that rotation point P must coincide with the center of curvature of wire $W_2$ when the vehicle travels along the curved wire in a steady-state condition, which means that the wheel axis $y_1$ must point toward that center of curvature. With that axis pointing toward or intersecting the wire center of curvature, it will become apparent that sensor S can have zero heading deviation $\psi$ and zero lateral displacement simultaneously only if the sensor is centered on axis $y_1$, i.e. only if dimension c is zero. If the c dimension is finite, the steady-state vehicle condition while rounding a curve necessarily will involve a finite value of heading deviation $\psi$ in accordance with the relationship given in equation (18), and it may involve a finite value of lateral displacement d.

With a vehicle wherein dimension c is finite, whether or not displacement d will be zero or finite in steady-state depends upon the magnitude of the M term, the heading sensitivity $K_2$, and unless d is zero, the displacement sensitivity $K_1$. The following equation expresses the relationship when $\psi$ and d are both finite:

$$+M + \arctan\frac{B}{\sqrt{(r_w - d)^2 - c^2}} + K_1 d + K_2 \arctan\frac{c}{\sqrt{(r_w - d)^2 - c^2}} = 0 \quad (20)$$

As an example, if a vehicle has a wheelbase B of 80 inches (203.2 cm.) dimension c=2.0 inches (5.08 cm.) the $K_1$ and $K_2$ factors are 0.0125 radian per inch (per 2.54 cm.) and 2.0 radian per radian, respectively, and the wire radius is 120 inches (304.8 cm.) of the M value applied is $-0.5880$, the heading value will be 0.0164 radian; the steering wheel angle will be $-0.5804$ radian, and a lateral displacement of $-2.015$ inches $(-5.12$ cm.) will occur, all in the steady-state.

The M term applied during a right turn is deemed a negative quantity, and vice versa. Thus if one wishes that steady-state lateral displacement be zero, the value of the M term should be:

$$-M = \text{arc tan} \frac{B}{\sqrt{r_w^2 - c^2}} + K_2 \text{arc tan} \frac{c}{\sqrt{r_w^2 - c^2}} \quad (21)$$

and under such conditions the steady-state heading deviation will be given by:

$$\sin \psi = c/r_w \quad (22)$$

If in the last prior example the M term were $-0.621402$ in accordance with equation (21), the steady-state conditions would be: $\psi = 0.01666$ radian, $\theta = -0.5880$ radian, and $d = +2.4 \times 10^{-5}$ inch ($6.2 \times 10^{-5}$ cm.).

The dimension c may be positive or negative, of course, in different applications. FIG. 9 illustrates how the magnitude of the M term should vary with dimension c to provide zero steady-state lateral displacement under some varied operating conditions. Curve #1 assumes $B = 80$ inches (203.2 cm.), $K_1 = 0.0125$, $K_2 = 2.0$ and $r_w = 120$ inches (304.8 cm.). Curve #2 assumes the same conditions as curve #1 except that $K_2$ is halved, to a value of 1.0. Curve #3 assumes the same conditions as curve #1 except that $r_w$ is increased to 240 inches (609.6 cm.). Curve #4 assumes the same conditions as curve #1 except that B is decreased to 40 inches (101.6 cm.). In selecting dimension c for a particular application, one should note its effect on the damping factor, which is discussed at length in my prior application.

In a vehicle wherein dimension c is zero, the steady-state heading deviation becomes zero and the steady-state steering angle is found from:

$$\tan \theta = -B/(r_w - d) \quad (23)$$

The relationship between steady-state lateral displacement and the M term is given by:

$$+M + \text{arc tan} \frac{B}{r_w - d_{ss}} + K_1 d_{ss} = 0 \quad (24)$$

and thus if, as is the ordinary case, zero steady-state displacement is desired, the magnitude of the M term should be:

$$-M = \text{arc tan} (B/r_w) \quad (25)$$

The analysis based on FIG. 3 and the above equations are based on assumption of travel with positive V, i.e. travel with the non-steered wheels leading. If the direction of V is reversed, the sign of the $K_2 \psi$ term in the command equation must be reversed, as is explained in my copending application. However, a reversal of V should not result in a reversal of the M term added to the command equation. A reversal of V does affect the magnitude of the M term which should be used, however, if dimension c is not zero. The differing value can be found by reversing the sign of the last term in equation (21). The abscissa values in FIG. 9 are shown for forward travel, but if their signs are reversed they apply to reverse travel. Thus if a vehicle has its sensor mounted an appreciable c distance from the axis of its non-steerable wheels, it becomes desirable to change the value of its M term used for a given wire radius between $+V$ and $-V$ directions of travel.

If an M value is selected which will produce a steady-state lateral displacement on a turn of given radius, one should note that whether the displacement can ever reach or exceed that steady-state value depends upon the damping ratio of the vehicle and upon the length of the turn. If the vehicle is underdamped, the displacement which occurs upon entry into a turn can exceed the mentioned steady-state values as overshoot occurs before the system settles at a steady-state value.

Traversing a turn tends to increase vehicle damping by amounts which become significant as guidewire radius approaches and becomes less than vehicle wheelbase B. Curves in FIG. 10a illustrate how a vehicle having given $K_1$ and $K_2$ sensitivity values recovers from a given step displacement with several different guidewire curvatures. In FIG. 10a it is assumed that dimension c is zero, that the M term applied during the turn is the proper value to provide zero steady state displacement, and that the heading deviation at the start of the turn is zero. The curve wherein radius $r_w$ is very great compared to wheelbase B approximates the response during straight wire travel, of course. It will now be apparent that one may offset the added damping which a turn will cause by appropriately decreasing the $K_2$ value and/or increasing the $K_1$ value during the turn.

If a vehicle having a finite c dimension has zero heading deviation and zero displacement at the start of a turn when the M value is applied, the vehicle experiences a temporary lateral displacement as the heading deviation approaches its steady-state value of arc sin $c/r_w$, with one or more overshoots, of course, if the vehicle is sufficiently underdamped. FIG. 12 illustrates how heading, displacement and steering wheel angle $\theta$ vary in such a system if the M value which is applied is that value which will give zero steady state displacement. If the vehicle whose characteristics are plotted in FIG. 12 began the turn with some positive displacement, the maximum negative displacement which it would reach during the turn would be decreased from that shown. Thus it sometimes will be deemed desirable to apply the M signal to the steering servo before the sensor reaches curved wire, at the time when the axis $y_1$ reaches curved wire, for example.

Various refinements may be readily made, so that the M term which is applied is not a fixed value, even for a guidewire of constant curvature, but instead varies to some extent as a function of heading deviation and/or lateral displacement, and/or steering wheel angle, since voltages representing those variables are already available aboard the vehicle. In FIG. 10 curve #1 illustrates the manner in which a critically damped vehicle ($B=80$, $C=0$, $K_1=0.0125$, $K_2=2.0$) recovers from an initial lateral displacement of $-3.0$ inches ($-7.62$ cm.) with zero heading deviation, from a guidewire having a radius of curvature of 120 inches (304.8 cm.) when traveling at a constant speed, if the magnitude of the M term is arc tan $(B/r_w)$. Curves #2 to #5 illustrate the effect if the M term also varies inversely with displacement in accordance with the functions labeling those curves in FIG. 10, and one can readily see that increasing the magnitude of the inverse d component in the M term decreases the system damping factor, causing quicker recovery but some overshoot. Conversely, one can increase the damping factor by utilizing the d term in an opposite sense, as is illustrated by curves #6 and #7 in FIG. 10. All of the curves in FIG. 10 assume the same vehicle speed. If the vehicle speed were materially decreased, the amplitudes of the oscillations depicted in FIG. 10 would be reduced. The M term can also have the form arc tan $(B/r_w) + K_3 d$, where $K_3$ can be plus or minus. The effect of including a d component in the M term will be seen upon reflection to be equivalent to increasing or decreasing the $K_1$ gain factor in the command equation while the M term is applied. The M term also may be made to vary as a function of heading deviation $\psi$, with the same effects that increasing or decreasing the $K_2$ term would have.

Figure 8A:
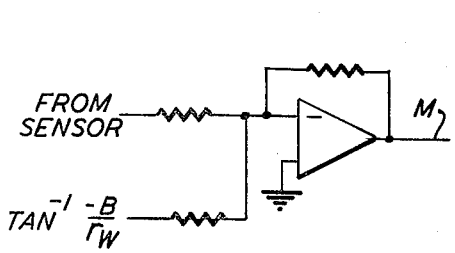
FIGS. 8a and 8b illustrate various refinements which may be used with the invention.
Figure 8B:
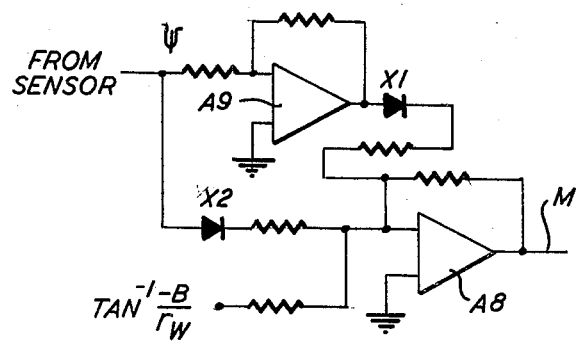

Various refinements may be readily made so that the M term which is applied is not a fixed value, even for a guidewire of constant curvature, but instead varies to some degree with heading deviation and/or lateral displacement, and/or steering wheel angle, since voltages representing those variables are available from the sensor assembly. In FIG. 8a the d signal from sensor S will be seen to increase or decrease the M signal in accordance with sense and magnitude of the instantaneous lateral displacement. In FIG. 8b the $\psi$ signal from the sensor will be seen to decrease the M signal for values of $\psi$ other than zero. The arc tan $(-B/r_w)$ fixed input signal is assumed to have a negative polarity. During one sense of heading deviation a positive signal is applied to amplifier A8 through unity-gain inverter amplifier A9 and diode X1, and during an opposite-sense heading deviation a positive signal is applied directly via diode X2. The technique illustrated in FIG. 8a can decrease the time required for displacement to be reduced to zero if a displacement is present at the time the M signal is first applied; but use of too much d signal in the M term can result in instability. In most applications of the invention the use of the added techniques typified in FIGS. 8a and 8b will be deemed unnecessary.

The preceding analysis assumed steering wheel feedback potentiometer P1 in FIG. 1 to be a linear potentiometer, resulting in the command equation set forth above at (9). If one provides a non-linear feedback potentiometer at P1, such as a tangent function potentiometer, for example, the command equation becomes:

$$M - \tan\theta + K_1 d + K_2 \psi = 0 \quad (33)$$

The terms applied to summing amplifier SA in FIG. 1 then will command the tangent of the steering wheel angle $\theta$ rather than the angle $\theta$ itself, and the values applied by switches S1 to S4 in FIG. 1 should be scaled in accordance with the value $(-B/r_w)$ (assuming c=0) rather than the arc tangent of that value. If c is not zero, ideal M values for zero lateral displacement will differ, of course.

In different applications different steering characteristics may be desired, such as travel slightly inside or outside the wire, rather than tracking exactly over the wire. It may be desired to minimize the floor area or space required for turning, and constraints put on heading deviations so that the rear end of the vehicle does not swing out too far, for example.

It will be apparent that the circuits of FIGS. 6b and 6d may use M values other than arc tan $(B/r_w)$, such as values computed according to equation (21), for example.

The steering servo bandwidth has been assumed to be significantly greater than that required to steer the vehicle, so that any phase lags in the steering servo can be deemed negligible, as was discussed in my prior application.

Figure 7A:
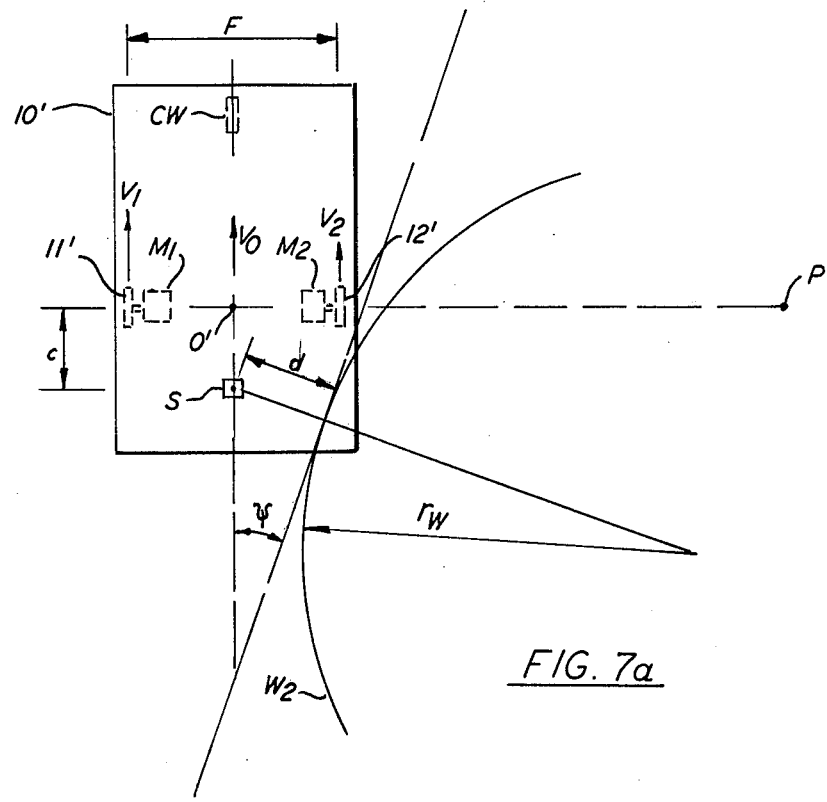
FIG. 7a is a geometrical plan view diagram of a sensor-carrying vehicle which is stirred by differential speed control of its drive wheels.

In FIG. 7a a vehicle 10' is supported on a pair of drive wheels spaced laterally apart a distance F, and on a caster wheel CW. Wheels 11' and 12' are driven by separate motors M1 and M2, respectively, and steering is controlled by varying the speeds of the two motors relative to each other. A sensor S is shown mounted on the vehicle x axis distance c from the axes of wheels 11', 12'. The sensor is shown at a heading angle $\psi$ and a lateral displacement d from a curved guidewire W2, just as shown in FIG. 3 for a steerable wheel vehicle. If the speeds $V_1$ and $V_2$ of wheels 11' and 12' differ in proportion to their respective distances from point P, the vehicle will rotate about point P, and its rate of change $\omega_v$ of heading will be:

$$\omega_v = (V_1 - V_2)/F \quad (34)$$

The velocity $V_o$ of point $O'$ midway between the wheels manifestly will be:

$$V_o = (V_1 + V_2)/2 \quad (35)$$

The velocity of the analogous point O in FIG. 3 is equal to $V \cos\theta$, from which one can deduce that:

$$V = V_o/\cos\theta \quad (36)$$

Equating the rate of turn $\omega_v$ given just above with:

$$\omega_v = -V \sin\theta/B \quad (37)$$

applicable in FIG. 3, one may derive the relationship:

$$\frac{\tan\theta}{B} = \frac{-(V_1 - V_2)}{V_o F} \quad (38)$$

Figure 7B:
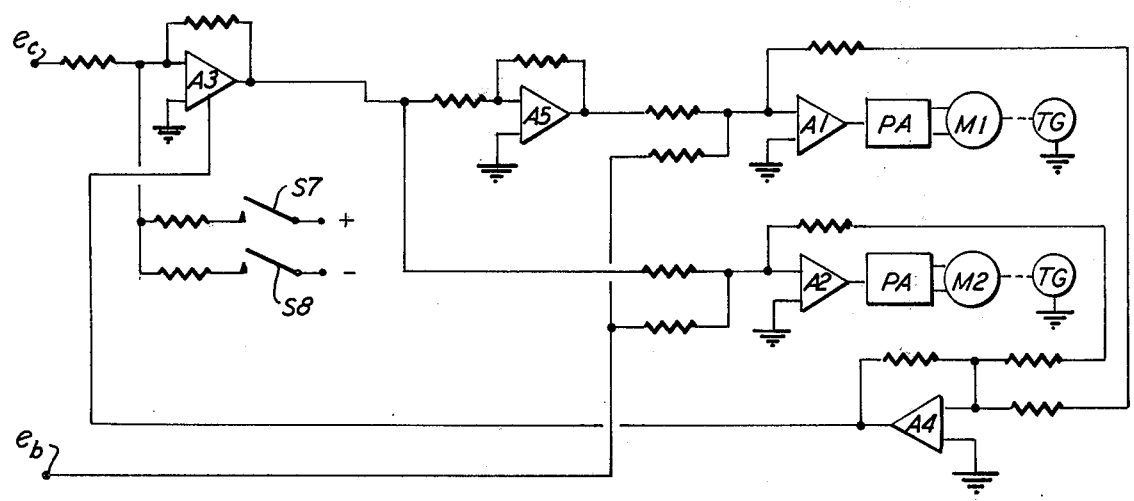

Substituting those relationships into equations (15) and (16), one may readily find that for the vehicle of FIGS. 7a and 7b:

$$\omega_s = \frac{V_1 - V_2}{F}\left(1 - \frac{c \sin\psi}{r_w - d}\right) - \frac{(V_1 + V_2)\cos\psi}{2 r_w} \quad (39)$$

$$\frac{dd}{dt} = \frac{(V_1 + V_2)}{2}\sin\psi - \frac{c(V_1 - V_2)\cos\psi}{F} \quad (40)$$

$\omega_s$ will be zero when:

$$\frac{V_1 - V_2}{V_1 + V_2} = \frac{F \cos\psi}{2(r_w + d - c \sin\psi)} \quad (41)$$

dd/dt will be zero when:

$$\frac{V_1 - V_2}{V_1 + V_2} = \frac{F \tan\psi}{2c} \quad (42)$$

With a vehicle wherein steering is controlled by controlling the ratio of the difference between drive wheel speeds to the sum of drive wheel speeds, to make $\psi$ and d zero the magnitude of the M term (with c=0), should be $F/2r_w$. If c is finite an ideal M term is:

$$\frac{F}{2\sqrt{r_w^2 - c^2}} \quad (43)$$

In FIG. 7b two individual motor speed control systems for two such drive motors M1 and M2 each include a summing amplifier, A1 and A2, a power amplifier PA and a tachometer generator TG. A voltage $e_b$ applied to amplifiers A1 and A2 sets a base speed for each motor. The basic command signal $e_c$ derived from the sensor is applied to amplifier A3, the gain of which is varied in proportion to the average $(V_1+V_2)$ of the speeds of motors M1 and M2. The average speed signal is shown derived by adding the voltage outputs to the two tachometer generators in amplifier A4, but in some applications merely using the $e_b$ voltage for gain control will be preferred. The output signal from amplifier A3 is applied to amplifier A2 and, after unity-gain inversion by amplifier A5, applied to amplifier A1. Thus during travel along a straight guidewire, the command signal differentially varies the speeds of motors M1 and M2. When the vehicle is centered over and aligned with the wire the command signal $e_c$ is zero and both motors rotate at the same speed, which is set by the voltage $e_b$. When a turn is encountered, switch S7 or S8 is closed by a floor magnet or like, which switch depending upon the direction of the turn. Closure of one switch or the other superimposes an M value upon the basic command signal by adding such a value into amplifier A3. The added value is removed as the vehicle leaves the turn and re-encounters a straight guidewire section. The system of FIG. 7b will be seen to be analogous to that of FIG. 1 wherein the added signal is also shown applied in step fashion, for use with a guidewire having step changes in its curvature. It will be apparent at this point that the value can instead be added and removed gradually using the technique of FIG. 6b or 6d, for example, for use with guidewires having gradually changing curvatures. It is to be noted that varying the gain of amplifier A3 in accordance with average speed results in maintenance of the same damping factor over a wide range of speeds without need to vary the relationship between the $K_1$ and $K_2$ values as speed varies. While FIG. 7 illustrates a preferred form of differential speed control wherein steering commands do not vary the average speed of the vehicle, the present invention is applicable as well with various non-linear forms of differential speed control, such as where a given command signal accelerates one motor without changing the speed of the other, or where a given command voltage accelerates or decelerates one motor to a lesser extent than it decelerates or accelerates the other motor, several such systems being shown in my prior applications, but a linear system of the type shown in FIG. 7a is preferred.

While FIG. 2 illustrates a system wherein stationary signaling means (magnets) are located adjacent points along the guidewire at which wire curvature changes it is by no means necessary that such signaling means be located there. A magnet, wheel-trip device, presence sensor, or the like can be located anywhere along the guidewire in advance of a change in guidewire curvature if the signal which it transmits to a vehicle is appropriately stored aboard the vehicle and thereafter called up when the vehicle reaches the point at which wire curvature changes. In FIG. 11a an incremental shaft encoder SE assumed to be rotated at a speed proportional to that of wheel SW in FIG. 3 applies pulses to a digital counter CNT, so that a count occurs for a predetermined small increment of vehicle travel. Presence sensor PS is located so as to send a signal to the vehicle when the vehicle is a substantial distance from a curvature change. Upon receipt of a signal from presence sensor PS, switch SS aboard the vehicle stores a predetermined number in counter CNT. Then as the vehicle continues to travel the shaft encoder decrements the counter. When its count reaches zero the counter provides an output signal which sets latch LL. Latch LL is arranged to apply the M term to the steering command signal, in the same manner as one of the latches in FIG. 1 or FIG. 6d, for example. Those skilled in the art will recognize that in lieu of a shaft encoder operating a counter, a tachometer generator driven at vehicle speed could charge an analog integrator connected to switch an analog voltage comparator to provide similar operation.

A microcomputer may be used instead.

The apparatus depicted in FIG. 11b does not require that any signals be transmitted to the vehicle to operate its turning control means while the vehicle is en route along the guidewire. The vehicle carries a digital memory RAM such as a CMOS random-access memory, in which a plurality of numbers are stored, each representing the distance along the guidewire from a starting point at which guidewire curvature changes, with data representing the direction and amounts of curvature change also stored in the memory. The data may be entered into the memory at the starting point. A shaft encoder SE' driven in proportion to vehicle travel applies pulses (via a conventional interface, not shown) to a microprocessor MP, which increments a memory location as each pulse occurs. The microprocessor repeatedly cycles through a simple program routine which compares the memory location being incremented with the stored list of numbers, and upon finding equality with one in the stored list, loads its associated wire curvature direction and amount data into output register R0. A conventional digital-to-analog converter DAC connected to register R0 provides the M signal which is applied together with the regular command signal to the steering control SC, whether it be a steerable wheel means or a differential speed control system.

It will become apparent to those skilled in the art that various switching and storage functions, such as those performed by the latches in FIG. 1, the integrations performed in FIGS. 6b and 6d, and various other functions disclosed could be readily performed by an on-board microprocessor system (e.g. Motorola Type 6800 with Type 6820 interface circuits) instead of by the dedicated hardware and analog circuits shown.

Minor changes required in various of the equations given above to adapt them to left turns, where $r_w$ is deemed negative will become apparent.

It will thus be seen that the objects set forth above, among those made apparent from the preceding description, are efficiently attained. Since certain changes may be made in carrying out the above method and in the constructions set forth without departing from the scope of the invention, it is intended that all matter contained in the above description or shown in the accompanying drawing shall be interpreted as illustrative and not in a limiting sense.

The embodiments of the invention in which an exclusive property or privilege is claimed are defined as follows:

1. In a guided ground vehicle having sensor means for sensing deviations of said sensor means from a reference path having a straight portion and a curved portion, command signal forming means responsive to signals from said sensor means for providing steering command signals which vary in accordance with a predetermined function of the position of said sensor means relative to said path, and steering means responsive to said command signals for steering said vehicle, the combination of: turning control means operative while said vehicle travels along said curved portion of said path for modifying said steering command signals by an amount substantially inversely commensurate with the radius of curvature of said curved portion.

2. A vehicle according to claim 1 in which said steering means comprises non-steered wheel means mounted on a lateral axis and steerable wheel means mounted a longitudinal wheelbase distance B from said axis.

3. A vehicle according to claim 1 in which said steering means comprises a pair of drive wheels mounted on an axis laterally apart a distance F and means for controlling the ratio of the difference between the speeds of said wheels to the sum of the speeds of said wheels.

4. A vehicle according to claim 1 wherein said vehicle includes a steerable wheel and said steering means comprises a position servomechanism operable to position said steerable wheel to steering angles commensurate with the values of said steering command signals.

5. A vehicle according to claim 1 wherein said vehicle includes a pair of drive motors and said steering means comprises means for differentially varying the speeds of said drive motors in amounts commensurate with the values of said steering command signals.

6. A vehicle according to claim 1 wherein said turning control means is operative to provide step changes in said steering command signals as said vehicle encounters said curved section and as said vehicle exits from said curved section.

7. A vehicle according to claim 1 wherein said turning control means is operable to gradually vary said steering command signals in accordance with a predetermined time function.

8. A vehicle according to claim 1 wherein said turning control means is operable to gradually vary said steering command signals at a rate commensurate with the speed of said vehicle.

9. A vehicle according to claim 1 wherein said turning control means is operable to gradually vary said steering command signals as said vehicle encounters portions of said curved section having varying radii of curvature.

10. A vehicle according to claim 1 wherein said turning control means comprises switching means operated by stationary objects situated substantially adjacent points along said reference path at which the curvature of said reference path changes.

11. A vehicle according to claim 1 wherein said vehicle includes means responsive to said sensor means for controlling propulsion of said vehicle when one of said deviations of said sensor exceeds a predetermined value during travel of said vehicle along either said straight section or said curved section.

12. A vehicle according to claim 1 having integrating means for measuring the distance of travel of said vehicle along said reference path, and means responsive to said integrating means for operating said turning control means at predetermined points along said reference path.

13. A vehicle according to claim 2 wherein said turning control means is operative to vary said steering command signals from said command signal forming means by substantially the amount operable to vary the steering angle of said steerable wheel means by $-\arctan(B/r_w)$, where $r_w$ is the radius of curvature of said curved portion of said reference path.

14. A vehicle according to claim 2 wherein said sensor meaans is longitudinally centered a distance c from said axis, wherein said steering command signal from said command signal forming means are operative to vary the steering angle of said steerable wheel means by $K_2$ angular units per unit of heading deviation and wherein said turning control means is operative to vary said steering command signals from said command signal forming means by substantially an amount operative to vary the steering angle of said steerable wheel by:

$$\arctan \frac{B}{\sqrt{r_w^2 - c^2}} + K_2 \arctan \frac{c}{\sqrt{r_w^2 - c^2}},$$

where $r_w$ is the radius of curvature of said curved portion of said reference path.

15. A vehicle according to claim 2 wherein said sensor means is longitudinally centered substantially on said axis, and wherein said turning control means is operative to vary said steering command signals from said command signal forming means by substantially the same amounts for forward and reverse directions of travel.

16. A vehicle according to claim 2 wherein said sensor means is longitudinally centered a distance c from said axis, and wherein said turning control means is operative to vary said signals from said command signal forming means by different amounts for forward and reverse directions of travel.

17. A vehicle according to claim 3 wherein said turning control means is operative to vary said steering command signals from said command signal forming means by substantially the amount operable to vary said ratio by a value of $F/2 r_w$ wherein $r_w$ is the radius of curvature of said curved portion of said reference path.

18. A vehicle according to claim 3 wherein said sensor means is longitudinally centered a distance c from said axis, and wherein said turning control means is operative to vary said steering command signals from said command signal forming means by substantially the amount operable to vary said ratio by a value of $F/2\sqrt{r_w^2-c^2}$, where $r_w$ is the radius of curvature of said curved portion of said reference path.

19. A vehicle according to claim 8 wherein said turning control means comprises means for providing a speed signal commensurate with said speed of said vehicle, means for integrating said speed signal to provide a second signal, and means for limiting the value of said second signal, said second signal being connected to vary said steering command signals.

20. A vehicle according to claim 8 wherein said turning control means comprises a pair of cascaded integrators operative to doubly-integrate a signal commensurate with vehicle speed to provide a second signal, said second signal being connected to vary said steering command signals.

21. A vehicle according to claim 12 wherein said integrating means comprises pulse generating means operative to provide successive pulses for successive increments of travel of said vehicle along said reference path, and pulse counting means for tallying said pulses.

22. A vehicle according to claim 21 having memory means for storing a first plurality of numbers representing distances to a plurality of locations along said reference path and a second plurality of numbers representing curvature characteristics of said reference path at said locations, means for comparing the count of pulses tallied by said pulse counting means with said numbers of said first plurality, and means responsive to the result of such comparisons for controlling said turning control means.

23. The method of automatically steering a vehicle along a reference path having a straight section and a curved section by means of a sensor operable to provide signals representing deviations of said vehicle from said reference path, comprising the steps of: processing said signals from said sensor to provide a steering command signal; steering said vehicle in response to said steering command signal; monitoring said signals from said sensor to automatically stop said vehicle if said signals from said sensor exceed a predetermined value; and varying said steering command signal by an amount inversely commensurate with the radius of curvature of said curved section while said vehicle travels along said curved section, thereby preventing said signals from said sensor from exceeding said predetermined value.

24. A vehicle according to claim 1 wherein said vehicle includes a steerable wheel and said steering means is operable to steer said vehicle to provide turning about an instantaneous point or rotation lying on a predetermined axis of said vehicle, and wherein said turning control means is operative to modify the steering angle of said steerable wheel substantially by an amount equal in radians to the ratio of the distance between said steerable wheel and said axis to said radius of curvature of said curved portion.

25. A vehicle according to claim 10 wherein said switching means comprises a latch connected to be set or cleared at various of said points along said reference path.

26. A vehicle according to claim 10 having means for reversing the sense in which said turning control means modify said steering command signals.

27. A vehicle according to claim 10 wherein said switching means comprises a plurality of switches spaced at different lateral positions on said vehicle and adapted to be operated by respective ones of said stationary objects.

28. A vehicle according to claim 26 having means responsive to the direction of travel of said vehicle for determining whether said latch is set or cleared at said various points along said reference path.

29. A vehicle according to claim 28 wherein a pair of said switches are laterally spaced apart on said vehicle at equal distances on opposite sides of the longitudinal axis of said vehicle.

30. An automatic guidance system for a ground vehicle, comprising a guidewire defining a reference path having straight sections and curved sections, and a plurality of signalling means spaced along said guidewire adjacent points at which curvature of said guidewire changes, said vehicle having a steerable wheel means, sensor means for sensing deviations of said vehicle from said reference path and providing steering signals to control the instantaneous steering angle of said steerable wheel means during travel of said sensor means along both said straight sections and said curved sections, and turning control means for modifying said steering signals during travel of said sensor means along said curved sections by superimposing on said steering signals turning signals inversely commensurate with the radius of curvature of said curved sections thereby to provide finite steering angles at said steerable wheel means even when said deviations are zero, said signalling means being operative to enable or disable the turning control means on said vehicle as said vehicle passes respective ones of said signalling means.

* * * * *